(12) United States Patent
Jones et al.

(10) Patent No.: US 8,634,436 B2
(45) Date of Patent: Jan. 21, 2014

(54) METHOD AND APPARATUS FOR STATISTICAL MULTIPLEXING

(75) Inventors: Anthony Richard Jones, Farnham (GB); Alois Martin Bock, Hampshire (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 259 days.

(21) Appl. No.: 13/131,117

(22) PCT Filed: Nov. 25, 2008

(86) PCT No.: PCT/EP2008/066169
§ 371 (c)(1),
(2), (4) Date: May 25, 2011

(87) PCT Pub. No.: WO2010/060463
PCT Pub. Date: Jun. 3, 2010

(65) Prior Publication Data
US 2011/0235654 A1   Sep. 29, 2011

(51) Int. Cl.
*H04J 3/16* (2006.01)
(52) U.S. Cl.
USPC .......................................................... 370/465
(58) Field of Classification Search
USPC .......................................................... 370/465
See application file for complete search history.

(56) References Cited

U.S. PATENT DOCUMENTS 6,038,256 A * 3/2000 Linzer et al. ............. 375/240.12
6,259,733 B1  7/2001 Kaye et al.
7,424,058 B1  9/2008 Staley et al.
2006/0224762 A1 10/2006 Tian et al.
2006/0256856 A1* 11/2006 Koul et al. ............... 375/240.03

FOREIGN PATENT DOCUMENTS

EP          0 759 667       2/1997
WO     WO 2004/025405      3/2004

OTHER PUBLICATIONS

International Search Report for PCT/EP2008/066169, mailed Aug. 12, 2009.
Written Opinion of the International Searching Authority for PCT/EP2008/066169, mailed Aug. 12, 2009.
Hang, X.M. et al., "Constant Quality Constrained Rate Allocation for FGS-CODED Video", IEEE Transactions on Circuits and Systems for Video Technology, vol. 13, No. 2, (Feb. 1, 2003), pp. 121-130.

* cited by examiner

*Primary Examiner* — Sai-Ming Chan
(74) *Attorney, Agent, or Firm* — Nixon & Vanderhye, P.C.

(57) ABSTRACT

There is provided a method of statistically multiplexing a plurality of input video data streams into at least one output data stream having a pre-determined capacity, comprising providing a plurality of bit rate estimates at different quality levels for each input video data stream using a look-ahead encoder, summing together the bit rate estimates of the same quality level for all input video data streams, determining the picture quality of each input video data stream at which the summed bit rate estimates is equal to or less than the output data stream pre-determined capacity. There is also provided an apparatus and system for carrying out the method, and a computer readable product carrying instructions which when executed carry out the method.

16 Claims, 6 Drawing Sheets

| Spatial activity | Criticality | Spatial activity | Criticality |
|---|---|---|---|
| <= 13 | 0 | 12032..12668 | 32 |
| 14..79 | 1 | 12669..13317 | 33 |
| 80..184 | 2 | 13318..13979 | 34 |
| 185..320 | 3 | 13980..14654 | 35 |
| 321..485 | 4 | 14655..15341 | 36 |
| 486..676 | 5 | 15342..16041 | 37 |
| 677..890 | 6 | 16042..16753 | 38 |
| 891..1127 | 7 | 16754..17477 | 39 |
| 1128..1386 | 8 | 17478..18213 | 40 |
| 1387..1665 | 9 | 18214..18961 | 41 |
| 1666..1964 | 10 | 18962..19721 | 42 |
| 1965..2282 | 11 | 19722..20492 | 43 |
| 2283..2618 | 12 | 20493..21275 | 44 |
| 2619..2973 | 13 | 21276..22070 | 45 |
| 2974..3345 | 14 | 22071..22876 | 46 |
| 3346..3734 | 15 | 22877..23693 | 47 |
| 3735..4139 | 16 | 23694..24522 | 48 |
| 4140..4561 | 17 | 24523..25362 | 49 |
| 4562..4999 | 18 | 25363..26213 | 50 |
| 5000..5453 | 19 | 26214..27075 | 51 |
| 5454..5922 | 20 | 27076..27948 | 52 |
| 5923..6406 | 21 | 27949..28832 | 53 |
| 6407..6905 | 22 | 28833..29726 | 54 |
| 6906..7419 | 23 | 29727..30631 | 55 |
| 7420..7947 | 24 | 30632..31547 | 56 |
| 7948..8489 | 25 | 31548..32474 | 57 |
| 8490..9046 | 26 | 32475..33411 | 58 |
| 9047..9616 | 27 | 33412..34359 | 59 |
| 9617..10199 | 28 | 34360..35317 | 60 |
| 10200..10797 | 29 | 35318..36285 | 61 |
| 10798..11407 | 30 | 36286..37264 | 62 |
| 11408..12031 | 31 | >= 37265 | 63 |

FIG. 4

METHOD AND APPARATUS FOR STATISTICAL MULTIPLEXING

This application is the U.S. national phase of International Application No. PCT/EP2008/066169, filed 25 Nov. 2008, which designated the U.S., the entire content of which is hereby incorporated by reference.

TECHNICAL FIELD

The invention is related to statistical multiplexing in general, and in particular to a statistical multiplexing method and apparatus suitable for statistically multiplexing video data streams.

BACKGROUND

Conventional multiplexing systems combine several input channels (i.e. data streams) to form a single output data stream, where the total group bit rate of the output data stream is the sum of the bit rates of the constituent parts. However, where the input data streams are the outputs of video or audio compression systems, the sum of their bit rates varies considerably and may regularly exceed the total capacity available in the transmission channel. One way to mitigate this problem is to constrain each channel to a bit rate allocation which is an appropriate share of the total output bit rate, but this requires that the respective channel picture quality is also constrained when the bit rate demand for that channel exceeds the fixed share bit rate allocated to that channel. Meanwhile, other channels may have spare capacity due to their lower instantaneous bit rate demands, but in such fixed share systems the spare capacity is not available for use by other input channels. It is therefore desirable to find means to avoid this quality loss and inefficient use of available output capacity.

A more flexible and effective approach, known as statistical multiplexing, combines a group of encoders to share a fixed total common bit rate, but instead of allocating a fixed bit rate to each encoder, a bit rate controller dynamically allocates different bit rates to each encoder depending on the instantaneous bit rate demand of the respective input video data streams (i.e. channels). The success of this scheme depends on the statistical behaviour of the several encoders and their input video or audio streams. Thus, occasionally, the bit rate demand of some input channels is momentarily lower than the average and so the excess bit rate can be collected in a common pool and re-allocated to supply more bit rate than the average to any channel whose demand is not fully met. As long as the instantaneous total group bit rate is equal to or less than the channel capacity, then no conflict arises between supply and demand. The aim is to allocate available bit rate to the channel encoders according to demand, so that the combined system achieves a more uniform picture quality on each encoder. By sharing out the total group bit rate between the channel encoders, the picture quality of all encoders can be improved compared to the average picture quality of fixed share bit rate systems.

FIG. 1 shows a block diagram of a statistical multiplexing system with three look-ahead encoders 120 and three main encoders 140. The look-ahead encoders 120 provide bit rate estimates to a bit rate controller 130 and these estimates are used by the bit rate controller 130 to allocate appropriate bit rates to the main encoders 140. Delays 160 are used on each channel, between the look-ahead encoders 120 and main encoder 140, to ensure the bit rate controls maintain synchronisation with the respective portion of the input video channels.

Existing statistical multiplexing systems provide single bit rate estimates to the bit rate controller 130. The bit rate controller 130 collects the bit rate estimates from all look-ahead encoders 120 within a statistical multiplexing group and allocates appropriate bit rates to the main encoders 140 dependent on the bit rate estimates.

If the bit rate controller 130 uses a linear allocation algorithm, there is a danger that non-critical channels do not get enough bit rate to achieve the same picture quality as highly critical material.

A similar situation exists if Standard Definition Television (SDTV) channels are statistically multiplexed with High Definition Television (HDTV) channels, since using a linear allocation algorithm would result in badly distorted SDTV channels because the HDTV channels would use up most of the group total bit rate. Therefore, current bit rate distribution methods use a non-linear algorithm to allocate a higher bit rate to non-critical channels relative to critical channels, and to SDTV channels relative to HDTV channels. This goes some way towards equalising picture quality among diverse video signals.

However, there is a disadvantage in using a non-linear distribution algorithm, and that is the bit rate savings of channels using lower resolutions, e.g. ¾ or ½ horizontal resolution, is significantly reduced. Furthermore, sequences with high spatial and/or temporal redundancies such as stills, colour bars or other static test signals end up using too much bit rate (i.e. more than actually required to produce an acceptable result). It is therefore necessary to find better methods and apparatus to manage the bit rate allocations used in statistical multiplexers, in the interests of improving quality for all input video or audio streams, and efficiency of the overall multiplexing system.

SUMMARY

Embodiments of the present invention provide a method of statistically multiplexing a plurality of input video data streams into at least one output data stream having a pre-determined capacity, comprising providing a plurality of bit rate estimates at different quality levels for each input video data stream, summing together the bit rate estimates of the same quality level for all input video data streams, determining the picture quality of each input video data stream at which the summed bit rate estimates is equal to or less than the output data stream pre-determined capacity.

In this way, the present invention provides a more efficient and robust method of statistically multiplexing video channels of differing criticality together into one or more output channels, because the picture quality of the respective input video channels is taken into account during the allocation of available output channel bit rate.

The method may also be used where audio only channels are to be sent together with the video channels (with or without sound). In such mixed systems, since typically the audio only channels are relatively small in size compared to the video channels, and do not use QP values as such, they can be provided with a small fixed rate portion of the overall capacity of the output channel. In effect, the output capacity is reduced to the amount of total output capacity left over after the audio only portions have been allocated. Where audio relating to the video is encoded together with the video, which is typical for the video with sound, then the audio is handled as part of the video data stream as described below.

Optionally, the different quality levels are determined from the Quantization Parameter, QP, used to provide a respective bit rate estimate.

Optionally, the method may further comprise adjusting one or more of the plurality of bit rates estimates using a bit rate correction factor.

Optionally, the bit rate correction factor is dependent upon calculated spatial and temporal activities of a respective video data stream.

Optionally, the spatial activity is calculated over a sample area using the equation:

$$\text{spatial\_activity} = \frac{1}{512}\sum_{x=1}^{N-1}\sum_{y=1}^{M}|Y_{x-1,y}+Y_{x,y}-Y_{x+1,y}-Y_{x+2,y}| + \frac{1}{512}\sum_{x=1}^{N}\sum_{y=0}^{M-1}|Y_{x,y}-Y_{x,y+1}|$$

wherein
- $Y_{x,y}$ is a luma sample at horizontal position x and vertical position y;
- $Y_{x+n,y}$ is the horizontally adjacent luma sample on the same video line;
- $Y_{x,y+1}$ is the vertically adjacent luma sample in the same video field/frame;
- N is the number of pixels in the sample area;
- M is the number of lines in the sample area.

The sample area should be a relatively large percentage of a field or frame, i.e. up to 80 to 90%.

Optionally, the bit rate correction factor further comprises a spatial correction factor portion, and wherein said spatial correction factor portion is determined from a criticality value, Cv, derived from a look up table relating criticality values to calculated spatial activities, said spatial correction factor portion being determined according to an equation:

spatial_correction_factor=1+(336−(21×Cv))/640 If Cv<16 spatial_correction_factor=1+(112−(7×Cv))/640 elsewhere

Optionally, the rate correction factor further comprises a temporal correction factor portion calculated from the average of the absolute values of the horizontal and vertical motion vectors, (av_MV_size), according to an equation:

temporal_correction_factor=1.4−0.165(ln(av_MV_size));

wherein ln( ) is the natural logarithm.

Optionally, the bit rate correction factor is dependent upon a measured Peak Signal to Noise Ratio of a respective input video data stream.

Optionally, the method further comprises companding the measured Peak Signal to Noise Ratio according to the following categories:

$PSNR_{factor}=PSNR_{measured}$ If $PSNR_{measured} \leq 40$ dB;

$PSNR_{factor}=42$ dB If $PSNR_{measured} > 50$ dB;

$PSNR_{factor}=0.2*PSNR_{measured}+32$ Elsewhere;

and the adjusting step comprises adjusting the bit rate estimates according to the equation:

bit_rate_estimate$_{adjusted}$=bit_rate$_{QP=N}$×10$^{(PSNRfactor-30)/30}$ wherein N=choice of QP value used to provide a respective initial bit rate estimate.

Optionally, the method further comprises interpolating the estimated bit rates.

Optionally, where the compression standard in use is H.264, the step of interpolating the estimated bit rates is carried out according to equations:

$$BE_n = 10^{log_{10}(BE_a)+(QP_n-QP_a)m}$$

wherein $BE_n$ is a bit rate estimate for the QP look-ahead picture quality point $QP_n$, $BE_a$ is a bit rate estimate for the QP look-ahead picture quality point $QP_a$, and $BE_b$ is a bit rate estimate for the QP look-ahead picture quality point $QP_b$ and:

$$m = \frac{\log_{10}(BE_a) - \log_{10}(BE_b)}{QP_a - QP_b}$$

wherein $QP_a$ and $QP_b$ are two known QP look-ahead picture quality points and $QP_n$ is a derived interpolated picture quality point.

Optionally, the method further comprises allocating an adjusted bit rate to be used to encode each input video data stream, wherein said allocation is carried out according to the equation:

$$AB = BE_n + \frac{(GB - \sum BE_n)(BE_{n+1} - BE_n)}{\sum BE_{n+1} - \sum BE_n}$$

where:
- AB is the allocated bit rate;
- GB is the total group bit rate (=output capacity of multiplexer);
- $BE_n$ is the bit rate estimate at a QP value where the sum of the video data stream bit rate estimates is lower than the total group bit rate;
- $BE_{n+1}$ is the bit rate estimate at a QP value where the sum of the video data stream bit rate estimates is higher than the total group bit rate.

Optionally, if the input video data streams are to be encoded according more than two compression standards, the method may further comprise converting QP values for one compression standard into QP values for another compression standard. Typically, the common standard will be H.264.

Embodiments of the present invention also provide a statistical multiplexing system comprising at least two look-ahead encoders, at least two main encoders, and a bit rate controller in communication with said at least two look-ahead encoders and at least two main encoders, wherein the at least two look-ahead encoders and bit rate controller are adapted to carry out the described methods according any embodiment of the invention.

Embodiments of the present invention also provide a computer-readable medium, carrying instructions, which, when executed by computer logic, causes said computer logic to carry out any of the described methods according any embodiment of the invention.

BRIEF DESCRIPTION OF THE DRAWINGS

A method of statistically multiplexing a plurality of input video data streams (i.e. channels) will now be described, by way of example only, with reference to the accompanying drawings in which:

FIG. 4 shows a look up table detailing the relationship between a criticality number used in an embodiment of the present invention and the calculated spatial activity for SDTV;

DETAILED DESCRIPTION

Figure 1:
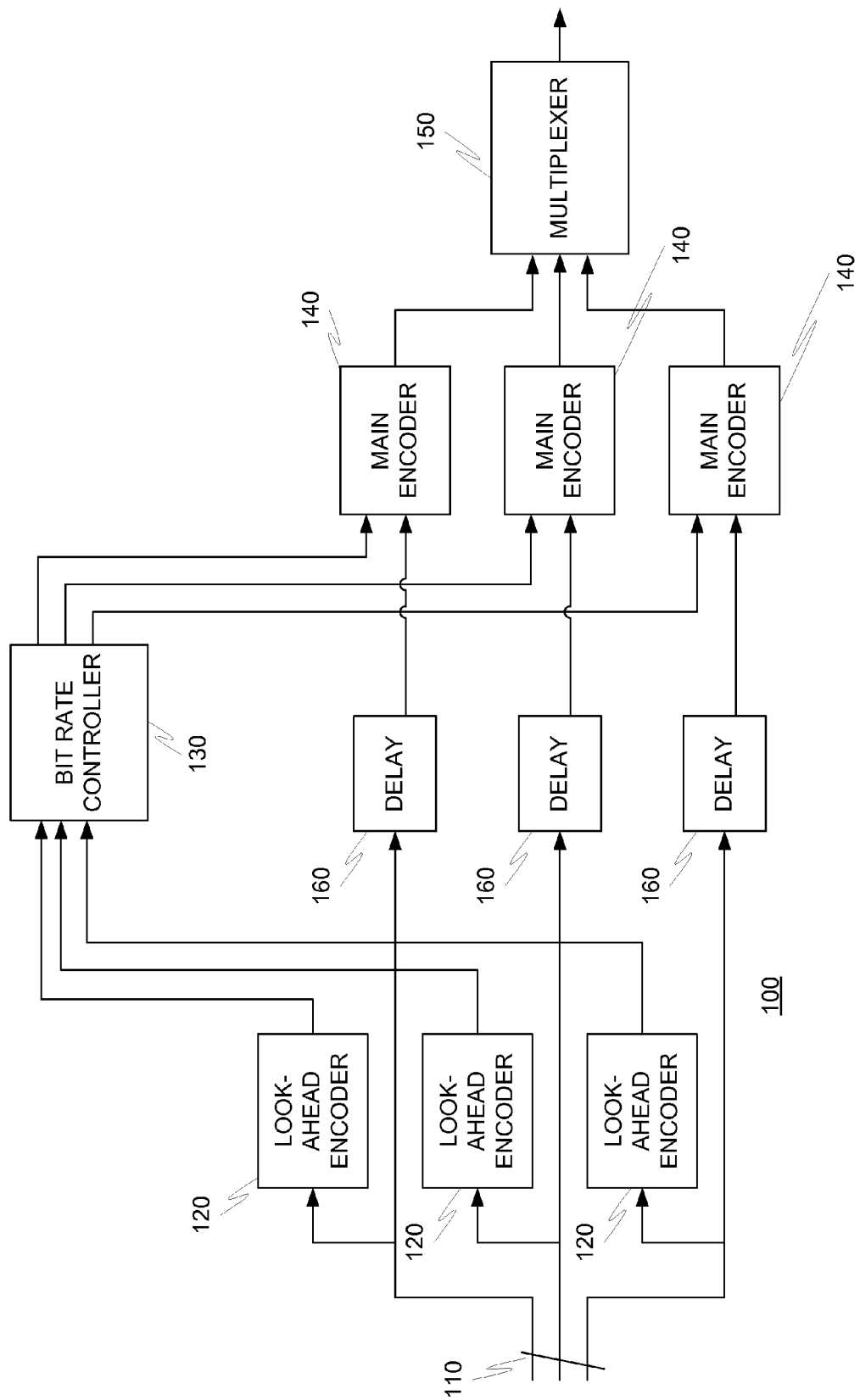
FIG. 1 shows a statistical multiplexing video encoding system with three input channels.

An embodiment of the invention will now be described with reference to the accompanying drawings in which the same or similar parts or steps have been given the same or similar reference numerals.

In brief overview, embodiments of the present invention provide an improved statistical multiplexing method and apparatus in which the look-ahead encoders provide multiple bit rate estimates to the bit rate controller, instead of only the single bit rate estimate of the prior art.

Each bit rate estimate produced by a look-ahead encoder corresponds to a particular, pre-determined picture quality. The picture quality points supplied by the look-ahead encoders are not necessarily coincidental, and so interpolation may be used to provide coinciding quality points, where appropriate. The picture quality is calculated as a function of Quantisation Parameter (QP) and measured spatio-temporal masking effects. The bit rate controller sums together the bit rate estimates of all look-ahead encoders at each picture quality point and calculates the respective individual instantaneous bit rates at which the sum of the bit rate estimates is equal to, or nearest to without exceeding, the total group bit rate output (i.e. the capacity of the intended transmission channel). Bit rate estimates at different quality points for each input video channel may also be used, if the channels to be multiplexed together are not intended to have the same quality. For example, in the case where a primary channel and a less important channel are multiplexed onto the same group bit rate.

In more detail, in order to improve the bit rate allocation between channels, the relationship between bit rate and picture quality has to be taken into account. The main factor affecting picture quality is the Quantisation Parameter (QP). Although the QP value used can change from macroblock to macroblock, in a preferred embodiment of the present invention, it is the average QP over an entire picture which is used as a picture quality parameter.

The relationship between the average QP value used and bit rate depends on the content of the video to be encoded and the compression standard used. In H.264, for example, the bit rate is approximately proportional to $2^{QP/6}$, i.e. $\Delta$ log(bit rate)/$\Delta$QP is linear. However, the gradient of $\Delta$ log(bit rate)/$\Delta$QP can vary significantly from one sequence to another. As an extreme example, the gradient of $\Delta$ log(bit rate)/$\Delta$QP on colour bars is zero.

Furthermore, the gradient of $\Delta$ log(bit rate)/$\Delta$QP depends on the operating quality point of the statistical multiplexing system. At extremely low bit rates (i.e. at a high QP value) the gradient tends to be lower than at higher bit rates. This is due to the fact that the number of DCT coefficients diminishes as the bit rate is reduced to extremely low values.

Figure 2:
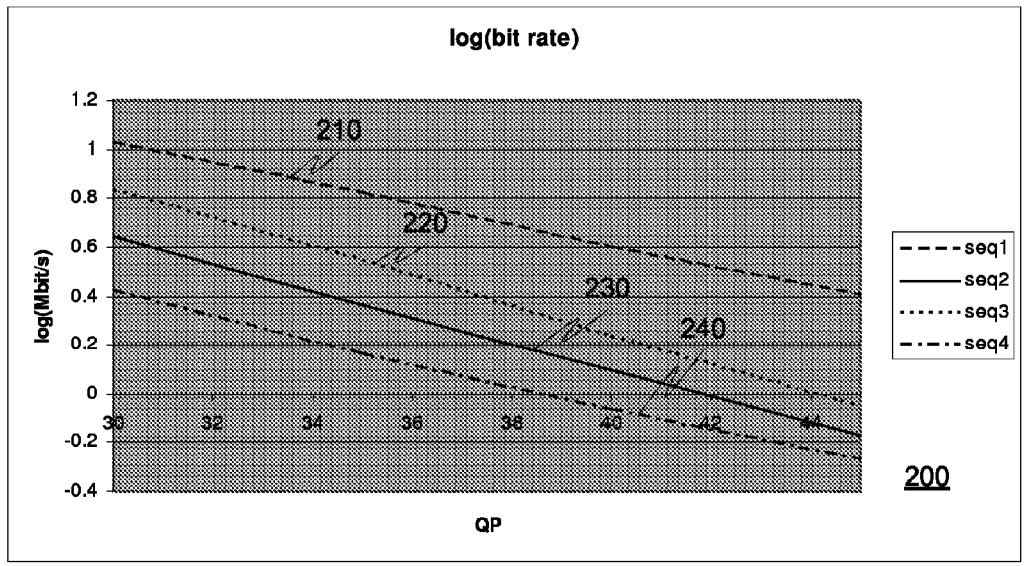
FIG. 2 shows a graph of log(Mbit/s) vs QP value for four example critical video sequences.

FIG. 2 shows the bit rate demand of four critical SDTV sequences (210-240) coded in H.264 as a function of QP. With these fairly critical sequences the gradient of $\Delta$ log(bit rate)/ $\Delta$QP varies between the sequences, but is relatively constant over the QP operating range for any given video sequence.

Figure 3:
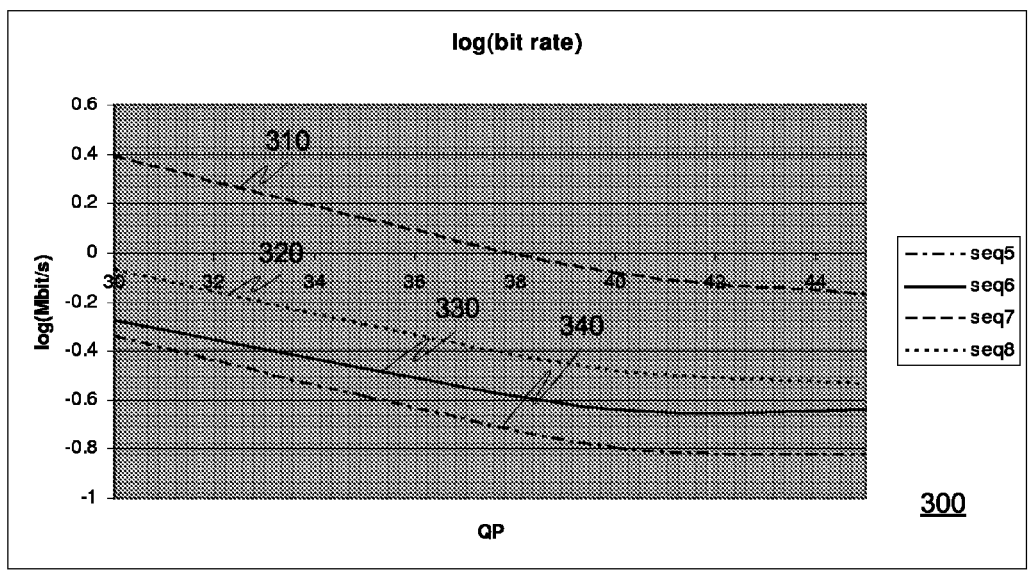
FIG. 3 shows a graph of log(Mbit/s) vs QP value for four example non-critical video sequences.

FIG. 3, however, shows some examples of non-critical sequences (310-340) over the same QP range. Not only do the gradients differ between sequences, they also each decrease in gradient as QP increases above 40. At the point where most DCT coefficients are quantised to zero, the bit rate demand stays constant even if the quantisation is increased.

Although the QP value used is the main factor affecting picture quality, accurate bit rate estimates can only be achieved if spatial and/or temporal masking effects are also taken into account. Non-critical sequences (310-340) with less spatial activity and/or slow motion (i.e. smaller temporal activity) require a relatively higher bit rate at the same QP than highly critical material (210-240). Therefore, the bit rate estimate at a given QP has to be adjusted according to the criticality of the video signal.

In order to adjust the bit rate estimates, a bit rate correction factor is applied to each estimate. There are two methods of determining the required bit rate correction factors, each used in an alternative embodiment of the present invention:

1. The bit rate correction factor is formed of two component parts indicative of spatial/temporal masking effects. In particular, a first component based on the calculated spatial activity for an input video sequence at a particular QP value, e.g. QP=30 in H.264, and a second component part based on the calculated temporal activity for the same input video sequence;

2. The bit rate correction factor is derived from the Peak Signal to Noise Ratio (PSNR) of an input video sequence, again compressed at a particular QP value, e.g. QP=30 in H.264, which is also indicative of spatial/temporal masking effects.

In method (1) according to a first embodiment of the present invention, the spatial and temporal masking effects can be independently adjusted, whereas in method (2) according to the second embodiment of the present invention, the spatial and temporal masking effects are adjusted together using a single control parameter.

Once corrected bit rate estimates are provided by either of the above two methods, the remainder of the method for each embodiment is largely similar, since both methods are effectively measuring the same thing, spatio-temporal masking effects, albeit with differing levels of complexity involved. This is because spatio-temporal masking effects are a visual property that can be measured either by spatial and temporal activities (in combination), or the PSNR (in isolation), as they are all interrelated.

Method (1)—Using Spatial and/or Temporal Activity Measurements

Spatial activity can be calculated over a sample area as shown in equation (1):

$$\text{spatial\_activity} = \frac{1}{512} \sum_{x=1}^{N-1} \sum_{y=1}^{M} |Y_{x-1,y} + Y_{x,y} - Y_{x+1,y} - Y_{x+2,y}| + \frac{1}{512} \sum_{x=1}^{N} \sum_{y=0}^{M-1} |Y_{x,y} - Y_{x,y+1}| \qquad (1)$$

Where
- $Y_{x,y}$ is a luma sample at horizontal position x and vertical position y;
- $Y_{x+n,y}$ is the horizontally adjacent luma sample on the same video line;
- $Y_{x,y+1}$ is the vertically adjacent luma sample in the same video field/frame;
- N is the number of pixels in the sample area;
- M is the number of lines in the sample area.

The sample area should be a relatively large—up to 80 to 90% of the total field or frame area.

The scale factor 1/512 is related to the lookup table of FIG. 4, which is a table of values designed for use with SDTV. A different scale factor may be used, for example when dealing with HDTV, and this will typically require a change to the lookup table values.

Having calculated the spatial activity, a criticality number can be derived from the spatial activity by using a lookup table as shown in FIG. 4.

Using the criticality value from FIG. 4, Cv, the spatial criticality correction factor can be calculated as shown in equation (2):

$$\text{spatial\_correction\_factor} = 1 + (336 - (21 \times Cv))/640 \text{ If } Cv < 16$$

$$\text{spatial\_correction\_factor} = 1 + (112 - (7 \times Cv))/640 \text{ elsewhere} \quad (2)$$

As the above equation (2) shows, if the criticality is less than 16 (i.e. spatial_activity<3735), the bit rate estimate is increased, otherwise it is decreased.

Meanwhile, temporal activity can be derived from the average motion vectors of P (predicted) pictures. The motion vectors of P pictures are used, because Direct Mode is often used on B pictures in H.264. Direct Mode is a method where motion vectors are calculated rather than transmitted. Therefore, in H.264, many B pictures contain very few motion vectors.

The average motion vector size (av_MV_size) is calculated as the average of the absolute values of horizontal plus vertical motion vectors, as shown in the equation (3) below:

$$\text{av\_MV\_size} = \frac{1}{N} \sum_N |MV_x| + |MV_y| \quad (3)$$

Where $MV_x$ is a horizontal motion vector, $MV_y$ is a vertical motion vector, and N=the number of motion vectors in the test field or frame.

Having calculated the average motion vector size (av_MV_size), a temporal correction factor can be calculated as shown in equation (4):

$$\text{temporal\_correction\_factor} = 1.4 - 0.165(\ln(av\_MV\_size)) \quad (4)$$

Where ln( ) is the natural logarithm, and the constants are independent of QP value used.

Having calculated the spatial and temporal correction factors as shown above, an adjusted bit rate estimate ($b\_r\_e_{adjusted}$) for each picture quality point (i.e. QP value) is calculated as shown in equation (5):

$$b\_r\_e_{adjusted} = \text{bit\_rate}_{QP=N} \times \text{spatial\_correction\_factor} \times \text{temporal\_correction\_factor} \quad (5)$$

Equation (5) takes the standard estimated bit rate for a particular sequence at a particular picture quality level (i.e. QP value), and applies an overall bit rate correction factor to adjust the estimated bit rates according to the spatio-temporal characteristics of the respective input video channels' content as calculated in equations (1-4) above. In this way, all the respective input video sequences/channels to the statistical multiplexing system are provided with picture quality adjusted estimated bit rates which provide a much more realistic and relevant comparison between varied video sources than the plain bit rate estimates would otherwise provide. In effect the bit rates have been "normalised" with respect to picture quality.

Method (2)—Using PNSR

A second method of taking spatial and temporal masking effects into account is to calculate the PSNR of the reconstructed image, based on a fixed quantisation level, again e.g. QP=30. It is a property of video compression that sequences with low spatio-temporal activity (i.e. low criticality) generate a higher PSNR than highly critical sequences at the same QP value. This is because plain picture areas produce less difference to the source than detailed areas.

The advantage of using PSNR at a fixed QP value, is that spatial and temporal activity are combined into a single number, and hence the calculation is less complex However, a problem with using PSNR as a measure of criticality is that static images and test patterns, such as colour bars, can generate extremely high PSNR numbers. Therefore, the following companding function is used to limit PSNR numbers:

$$PSNR_{factor} = PSNR_{measured} \text{ If } PSNR_{measured} \leq 40 \text{ dB}$$

$$PSNR_{factor} = 42 \text{ dB If } PSNR_{measured} > 50 \text{ dB}$$

$$PSNR_{factor} = 0.2 * PSNR_{measured} + 32 \text{ elsewhere} \quad (6)$$

The PSNR limits in function (6) are based on a PSNR measurement of QP=30 in H.264. Under those conditions simple test patterns such as colour bars generate PSNR numbers in excess of 50 dB. However, function (6) reduces the maximum PSNR to 42 dB. This upper limit is chosen to clip the bit rate correction factor to a maximum of 2.51. If higher bit rate correction factors were allowed, again too much bit rate would be allocated to simple test patterns such as colour bars.

Having calculated a limited PSNR (i.e. $PSNR_{factor}$), the adjusted bit rate estimate is determined as shown in equation (7):

$$\text{bit\_rate\_estimate}_{adjusted} = \text{bit\_rate}_{QP=30} \times 10^{(PSNR_{factor} - 30)/30} \quad (7)$$

Again, the bit rate is being "normalised" by a bit rate correction factor, this time based upon the PSNR rather than directly off the measured and adjusted spatio-temporal characteristics as before. This is again done so that comparisons between the different estimated bit rates at differing QP values are more realistic and relevant to one another. In particular, it can be seen that the bit rate correction factor is calculated such that at a PSNR of 30, the estimated bit rate remains unchanged, but is adjusted as the PSNR varies from 30. In the above example of equation (7), it is only coincidental that QP value of the video sequence under test is the same value (i.e. 30) as the PSNR threshold. The PSNR threshold would remain at 30 for all QP values used. The maximum range of QP values in H.264 is 0-51, but values between 25 and 40 are most typically used.

Remainder of Both Methods

Once the bit rate estimates have been adjusted to achieve the same picture quality at a given QP value, a set of realistic bit rate estimates at different QPs can be made available to the bit rate controller. Since each bit rate estimate at a given QP corresponds to the same picture quality, the bit rate controller can use a linear algorithm to allocate appropriate bit rates among the channels of a statistical multiplex group. Therefore, the need for a non-linear allocation algorithm has been eliminated.

An H.264 encoder can calculate a range of estimated bit rates for different QPs based on a minimum of two look-ahead picture quality points, e.g. QP=30 and QP=40 (which is the typical range of QP values used in direct to home H.264 based broadcasting systems), using the assumption that the gradient of Δ log(bit rate)/ΔQP is constant. If the total group bit rate is so low that the average QP is likely to go well above 40, a third QP look-ahead point, e.g. QP=50, might be appropriate. The constants used in equations (2) and (4) will not generally change with a change of QP value between 25 and 40, however, they may be adjusted if the QP value is at an extreme, such as 50. However, such picture quality operating points are not generally used because the picture quality would be very low, i.e. unacceptable.

In any case, the interpolated bit rate estimates are calculated as shown in equations (8) and (9) based on the two nearest QP look-ahead picture quality points $QP_a$ and $QP_b$:

$$BE_n = 10^{log_{10}(BE_a) + (QP_n - QP_a)m} \quad (8)$$

Where BE is the bit rate estimate for the QP look-ahead picture quality point $QP_n$, $BE_a$ is the bit rate estimate for the QP look-ahead picture quality point $QP_a$, and $BE_b$ is the bit rate estimate for the QP look-ahead picture quality point $QP_b$ and:

$$m = \frac{\log_{10}(BE_a) - \log_{10}(BE_b)}{QP_a - QP_b} \quad (9)$$

Where $QP_a$ and $QP_b$ are two known QP look-ahead picture quality points, and $QP_n$ is a derived interpolated picture quality point. Equations (8) and (9) are applicable for H.264 bit rate predictions.

However, they are not necessarily appropriate for other compression algorithms. In MPEG-2 systems, for example, it would be advantageous to generate a larger number of look-ahead points (>3 of example shown above), in order to improve the bit rate estimates over a large range of QP points. This is because the graph of QP value versus quality for MPEG-2 is not linear (see white line 720 of FIG. 6). The QP points calculated by different look-ahead encoders need not be coincidental because the bit rate controller can interpolate bit rate demands in between QP points, as described above.

Figure 5:
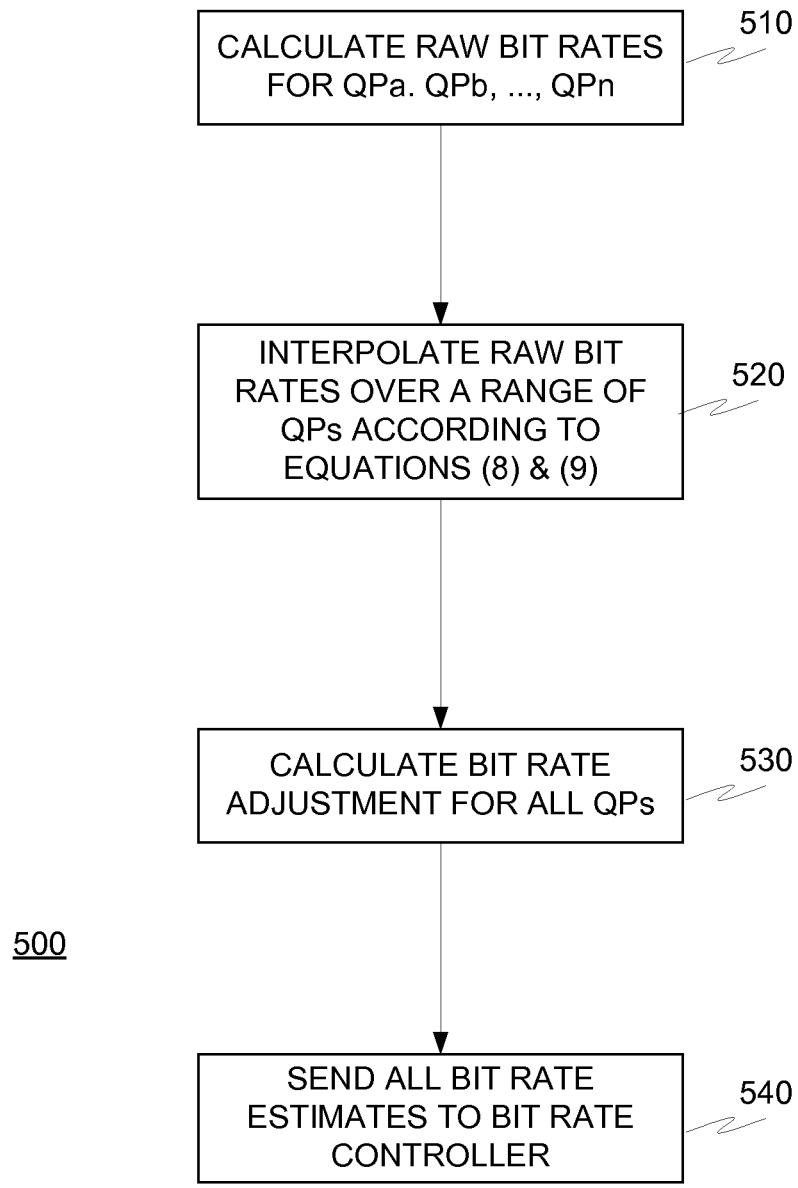
FIG. 5 shows a flow diagram of a first initial portion of the statistical multiplexing method according to an embodiment of the present invention.

FIG. 5 gives a summary of the calculations carried out in the look-ahead encoders. In particular, the method comprises the look-ahead encoders calculating the raw bit rates for the particular video input channel at each picture quality point 510, interpolating the results to provide a full range of possible picture quality point choices at step 520 (if required), calculating the bit rate adjustments, i.e. correction factors (according to method (1) or (2) above) 530, and then sending all the adjusted bit rates to the bit rate controller.

Since each look-ahead encoder is providing a series of picture quality adjusted bit rate estimates, the bit rate controller can assume a linear gradient of bit rate/QP because ΔQP is relatively small.

Using the picture quality adjusted bit rate estimates for several QP points, the bit rate controller can sum up the bit rate estimates of all channels at each picture quality (i.e. QP value) point and calculate allocated bit rates as follows:

$$AB = BE_n + \frac{(GB - \sum BE_n)(BE_{n+1} - BE_n)}{\sum BE_{n+1} - \sum BE_n} \quad (10)$$

Where:
AB is the allocated bit rate;
GB is the total group bit rate (=output capacity of multiplexer);
$BE_n$ is the bit rate estimate at a QP value where the sum of the bit rate estimates is lower than the total group bit rate;
$BE_{n+1}$ is the bit rate estimate at a QP value where the sum of the bit rate estimates is higher than the total group bit rate.

Figure 6:
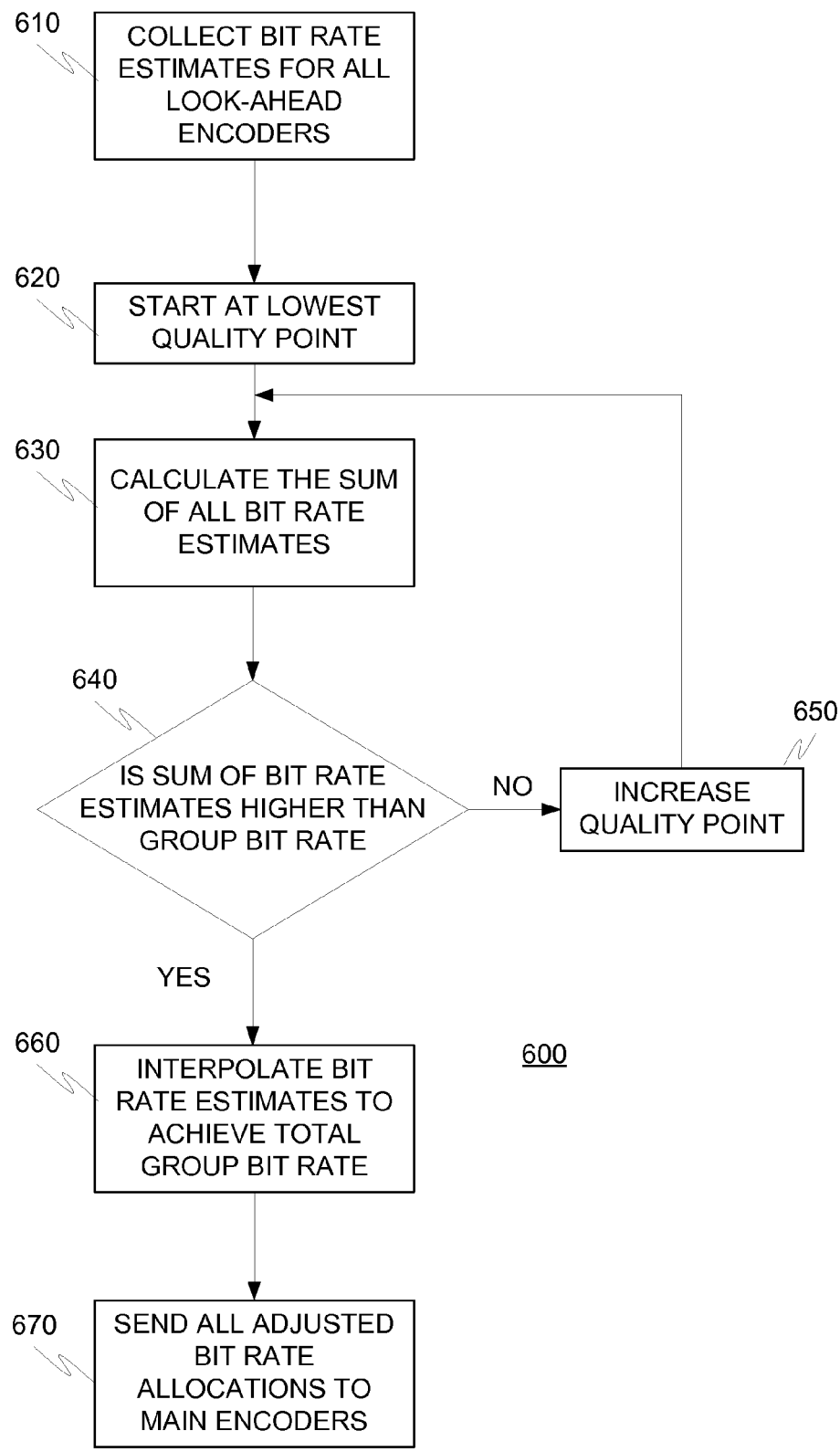
FIG. 6 shows a flow diagram of a second initial portion of the statistical multiplexing method according to an embodiment of the present invention.

FIG. 6 gives a summary of the calculations carried out in the bit rate controller.

The bit rate controller collects bit rate estimates from all look-ahead encoders at step 610. Starting at the lowest QP value available for the compression standard in use 620, e.g. QP=51 for H.264, the method comprises an iterative process, where the sum of all the bit rate estimates is calculated at step 630, and then the sum is tested to see if it exceeds the total group output bit rate available at step 640. If it does not, then the QP point is increased at step 650, and the method returns to the summation step 640.

However, once the total group bit rate is exceeded, the last but one QP value indicates value $BE_n$ for equations (8) to (10) above, while the current QP value indicates value $BE_{n+1}$. These values are then used at step 660 to determine the interpolated QP values where the estimated bit rates most closely match (but do not exceed) the total group bit rate. These then indicate suitable allocated bit rates for use by the main encoders. In certain circumstances, the actually measured and tested QP values of the input videos may happen to be suitable without the further interpolation step 660 being required.

Once suitable actually measured, or interpolated, QP values are known, the allocated bit rates can be derived according to equation (10) and then passed to the main encoders at step 670.

Since the algorithm starts at the lowest quality point, e.g. QP=51, the initial sum of the picture quality adjusted bit rate estimates is guaranteed to be lower than the group bit rate.

Alternative exploratory search methods could be used to find the correct bit rate sum. For example, the search could start lower down the QP scale, e.g. at QP=30, and then decide whether the bit rate sum at that selected quality point is too high or too low and move accordingly. If the bit sum is too high, the search would increase the QP value by a suitable step and retest again, e.g. test at QP=45. Whereas, if the bit sum is too low, the search would decrease the QP value by a suitable step and again re-test, e.g. test at QP=15. Using such a search method may be faster than the simple incremental one described above.

The proposed method is based on the assumption that, for a particular sequence, picture quality monotonically increases as quantisation decreases. This assumption holds true for all compression algorithms currently in use or envisaged for use.

However, since the quantisation parameters of different compression standards correspond to different picture qualities, the QP values of one compression standard cannot readily be used together with QP values from another compression standard in the above equations. Therefore, the differing QP values have to be converted into common equivalents.

This is best done by converting all QP values of other compression standards into equivalents of a chosen single compression standard, in order to be able to make like for like comparisons. Since the QP of H.264 has a finer granularity and a wider range of picture quality than most other compression algorithms, it is advantageous to use the QP of H.264 as a basis for picture quality.

Therefore, the following definition of picture quality is used:

$$Quality = 102 - (2 \times QP_{H.264}) \quad (11)$$

Figure 7:
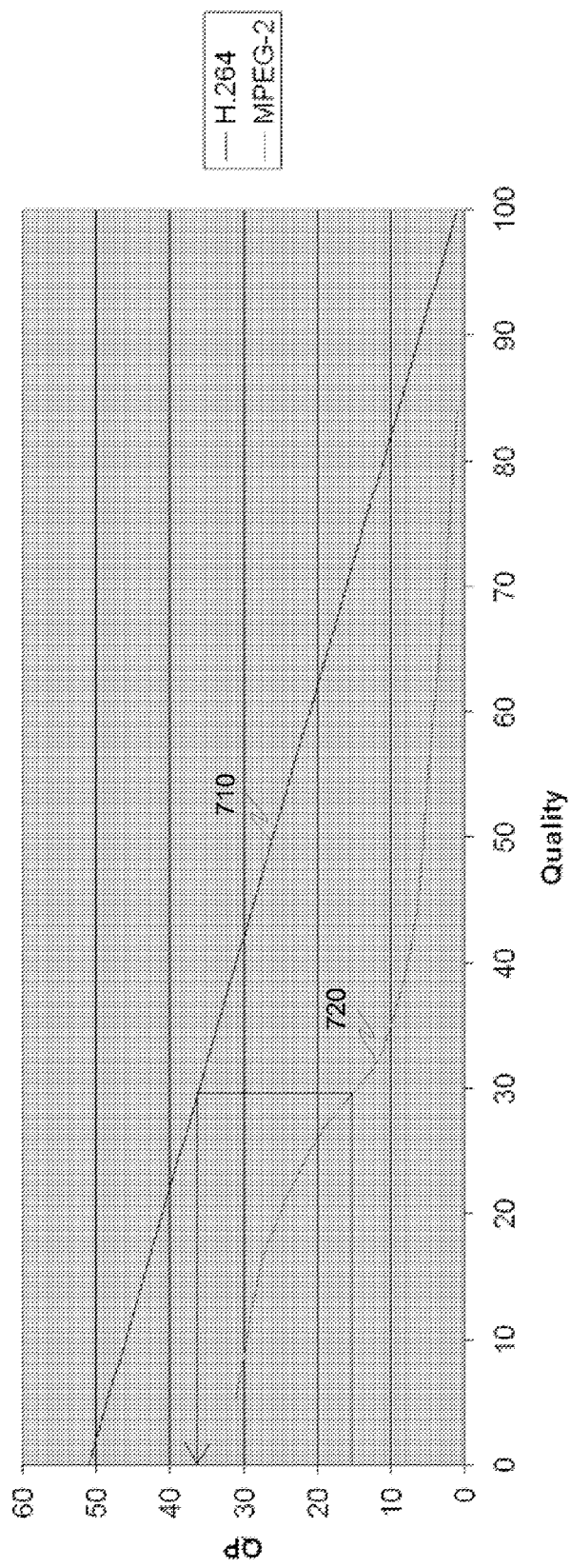
FIG. 7 shows a method of determining the equivalent H.264 QP value for a given MPEG-2 QP value from a graph of H.264/MPEG-2 QP values vs picture quality.

In order to find the equivalent QP of H.264 for the same picture quality, the QP values of other compression algorithms have to be converted to equivalent QP values of H.264. This is illustrated in FIG. 7, where the QPs of H.264, 710, and MPEG-2, 720, are plotted against subjective visual picture quality. It can be seen that based on this definition, the relationship of $QP_{MPEG-2}$ to picture quality (and to H.264 QP values) is highly non-linear.

Using FIG. 7, the QP of MPEG-2, can be converted to an equivalent QP of H.264. For example, a $QP_{MPEG-2}$ of 16, corresponds to a Quality of 32 which is equivalent to a $QP_{H.264}$ of 35. Therefore, by converting the QP values of non-H.264 compression standards into the equivalent QP values of H.264, the bit rate controller can make sure that the picture qualities of the H.264 and other compression algorithms are equivalent. A suitable hardware implementation of the QP conversion process is a lookup table having the required values therein.

It is to be noted that even where a particular compression standard has been converted into another compression standard's QP value range, the number of look-ahead points selected for the above equations should be based on the requirements of the original compression standard. This is because any non-linearity of the original compression standard will remain, even though the compression standard to which the QP values have been converted may feature more linearity.

The proposed statistical multiplexing method and apparatus provides a more accurate and efficient bit rate allocation, to achieve the same visual picture quality on all channels within a statistical multiplexing group. In particular, it achieves a more accurate bit rate allocation between video channels of differing criticality, e.g. lower and higher resolution bit streams such as SDTV versus HDTV.

The above described method may be carried out by suitably adapted hardware, such as an adapted form of the exemplary hardware implementation of a statistical multiplexer as shown in FIG. 1, where the adaptation involves providing look-ahead encoders and a bit rate controller adapted to carry out the above described methods. It is also possible to further improve the bit rate correction factor calculation by combining spatial/temporal activity measurements with PSNR measurements.

The method may also be embodied in a set of instructions, stored on a computer readable medium, which when loaded into a computer processor, Digital Signal Processor (DSP) or similar, causes the processor to carry out the hereinbefore described statistical multiplexing method.

Equally, the method may be embodied as a specially programmed, or hardware designed, integrated circuit which operates to carry out the method on video data loaded into the said integrated circuit. The integrated circuit may be formed as part of a general purpose computing device, such as a PC, and the like, or it may be formed as part of a more specialised device, such as a games console, mobile phone, portable computer device or hardware video encoder.

One exemplary hardware embodiment is that of a Field Programmable Gate Array (FPGA) programmed to carry out the described method, located on a daughterboard of a rack mounted video encoder, for use in, for example, a television studio or satellite or cable TV head end.

Another exemplary hardware embodiment of the present invention is that of a video pre-processor comprising an Application Specific Integrated Circuit (ASIC).

For some applications of statistical multiplexing, implementation issues such as cost and latency dominate and need to be given priority but without loss of picture quality. The above described second embodiment of the present invention addresses this area directly and provides very competitive performance compared to more fully resourced and complex methods such as those in the prior art.

It will be apparent to the skilled person that the exact order and content of the steps carried out in the method described herein may be altered according to the requirements of a particular set of execution parameters, such as speed of encoding, accuracy of detection, resolution of video sources, type of compression standards in use with the statistical multiplexing method, and the like. Accordingly, the claim numbering is not to be construed as a strict limitation on the ability to move steps between claims, and as such portions of dependent claims may be utilised freely.

The invention claimed is:

1. A method of statistically multiplexing a plurality of input video data streams into at least one output data stream having a predetermined capacity, comprising:
    providing a plurality of bit rate estimates at different picture quality levels for each of the input video data streams being received at a plurality of first encoders;
    summing together, using a bit rate controller configured to communicate with the plurality of first encoders, the bit rate estimates of the same picture quality level for all the input video data streams;
    determining a picture quality level of each of the input video data streams at which the summed bit rate estimates is equal to or less than the predetermined capacity; and
    providing a bit rate based at least partly on the determined picture quality level for each of the input video streams to respective second encoders for multiplexing into the at least one output data stream.

2. The method of claim 1, wherein the different picture quality levels are determined from a Quantization Parameter, QP, used to provide a respective bit rate estimate.

3. The method of claim 1, further comprising:
    adjusting one or more of the plurality of bit rate estimates using a bit rate correction factor.

4. The method of claim 3, wherein said bit rate correction factor is dependent upon calculated spatial and temporal activities of a respective input video data stream.

5. The method of claim 4, wherein said spatial activity is calculated over a sample area using an equation:

spatial_activity=

$$\frac{1}{512}\sum_{x=1}^{N-1}\sum_{y=1}^{M}|Y_{x-1,y}+Y_{x,y}-Y_{x+1,y}-Y_{x+2,y}|+\frac{1}{512}\sum_{x=1}^{N}\sum_{y=0}^{M-1}|Y_{x,y}-Y_{x,y+1}|$$

wherein
    $Y_{x,y}$ is a lama sample at horizontal position x and vertical position y;
    $Y_{x+n,y}$ is the horizontally adjacent luma sample on the same video line;

$Y_{x,y+i}$ is the vertically adjacent luma sample in the same video field/frame;

N=number of pixels in the sample area; and

M=number of lines in the sample area.

6. The method of claim 4, wherein the bit rate correction factor comprises a spatial correction factor portion, and wherein said spatial correction factor portion is determined from a criticality value, Cv, derived from a look up table relating criticality values to calculated spatial activities, said spatial correction factor portion being determined according to an equation:

spatial_correction_factor=1+(336−(21×$Cv$))/640 If Cv<16 spatial_correction_=1+(112−(7×$Cv$))/640 elsewhere.

7. The method of claim 4, wherein the bit rate correction factor comprises a temporal correction factor portion calculated from an average of the absolute values of the horizontal and vertical motion vectors, (av_MV_size), according to an equation:

temporal_correction_factor=1.4−0.165(ln($av\_MV\_size$));

wherein ln( ) is the natural logarithm.

8. The method of claim 3, wherein said bit rate correction factor is dependent upon a measured Peak Signal to Noise Ratio of a respective input video data stream.

9. The method of claim 8, further comprising:

companding the measured Peak Signal to Noise Ratio according to the following categories:

$PSNR_{factor}$=$PSNR_{measured}$ If $PSNR_{measured}$ 4 OdB;

$PSNR_{factor}$=42 dB If $PSNR_{measured}$>5 OdB;

$PSNR_{factor}$=0.2*$PSNR_{measured}$+32 Elsewhere;

and wherein said adjusting step comprises adjusting the bit rate estimates according to equation:

bit_rate_estimate$_{adjusted}$=bit_rate$_{QP=N}$×10$^{(PSNRfactor−30)/30}$ wherein N is a choice of QP value used to provide a respective bit rate estimate.

10. The method of claim 1, wherein the method further comprises interpolating the bit rate estimates.

11. The method of claim 10, wherein a compression standard in use is H.264, and the step of interpolating the estimated bit rates is carried out according to equation:

$BE_n = 10^{log10(BEa)+QP_n-QP_a)m}$ wherein $BE_n$ is a bit rate estimate for the QP look-ahead picture quality point $QP_n$, $BE_a$ is a bit rate estimate for the QP look-ahead picture quality point $QP_{a1}$ and $BE_b$ is a bit rate estimate for the QP look-ahead picture quality point $QP_b$ and:

$$m = \frac{\log_{10}(BE_a) - \log_{10}(BE_b)}{QP_a - QP_b}$$

wherein $QP_a$ and $QP_b$ are two known QP look-ahead picture quality points and $QP_n$ is a derived interpolated picture quality point.

12. The method of claim 1, further comprising allocating an adjusted bit rate to be used to encode each of the input video data streams, wherein said allocation is carried out according to the equation:

$$AB = BE_n + \frac{(GB - \sum BE_n)(BE_{n+1} - BE_n)}{\sum BE_{n+1} - \sum BE_n}$$

wherein:

AB is an allocated bit rate;

GB is a total group bit rate (=output capacity of multiplexer);

$BE_n$ is a bit rate estimate at a QP value where the sum of the video data stream bit rate estimates is lower than the total group bit rate; and $BE_{n+1}$ is a bit rate estimate at a QP value where the sum of the video data stream bit rate estimates is higher than the total group bit rate.

13. The method of claim 1, wherein the input video data streams are to be encoded according to at least two compression standards, and the method further comprises:

converting QP values for one compression standard into QP values for another compression standard.

14. A statistical multiplexing system comprising:

at least two look-ahead encoders;

at least two main encoders; and a bit rate controller in communication with the at least two look-ahead encoders and the at least two main encoders, wherein the at least two look-ahead encoders and the bit rate controller are adapted to perform operations comprising;

providing a plurality of bit rate estimates at different picture quality levels for each of the input video data streams;

summing together the bit rate estimates of the same quality level for all the input video data streams; and determining a picture quality level of each of the input video data streams at which the summed bit rate estimates is equal to or less than the predetermined capacity.

15. A non-transitory computer-readable storage medium, carrying instructions which, when executed by computer logic, causes said computer logic to perform operations comprising;

providing a plurality of bit rate estimates at different picture quality levels for each of the input video data streams;

summing together the bit rate estimates of the same quality level for all the input video data streams; and determining a picture quality level of each of the input video data streams at which the summed bit rate estimates is equal to or less than the predetermined capacity.

16. A method of statistically multiplexing a plurality of input video data streams into at least one output data stream having a predetermined capacity, comprising:

determining, using a bit rate controller configured to communicate with a plurality of first encoders, a plurality of summed bit rates, each of the summed bit rates corresponding to a respective one of a plurality of picture quality levels and representing a summation of bit rate estimates for respective input video data streams received from the plurality of first encoders at the corresponding picture quality level;

selecting one of the summed bit rates based upon the selected one of the summed bit rates being equal to or less than the predetermined capacity;

allocating a bit rate to one of the input video data streams for use in the at least one output data stream, the allocated bit rate being at least partly based upon a bit rate estimate for the one of the input video data streams included in the selected one of the summed bit rates; and providing the allocated bit rate to a second encoder for multiplexing into the at least one output data stream.

* * * * *

UNITED STATES PATENT AND TRADEMARK OFFICE
CERTIFICATE OF CORRECTION

PATENT NO.        : 8,634,436 B2
APPLICATION NO.   : 13/131117
DATED             : January 21, 2014
INVENTOR(S)       : Jones et al.

Page 1 of 2

It is certified that error appears in the above-identified patent and that said Letters Patent is hereby corrected as shown below:

On the title page, in the Figure, for Tag "510", in Line 2, delete "QPa. QPb,..., QPn" and insert -- $QP_a$, $QP_b$,..., $QP_n$ --, therefor.

In the Drawings

In Fig. 5, Sheet 4 of 6, for Tag "510", in Line 2, delete "QPa. QPb,..., QPn" and insert -- $QP_a$, $QP_b$,..., $QP_n$ --, therefor.

In the Specification

In Column 8, Line 11, delete "PNSR" and insert -- PSNR --, therefor.

In Column 8, Line 22, delete "complex" and insert -- complex. --, therefor.

In Column 9, Line 26, delete "BE" and insert -- $BE_n$ --, therefor.

In Column 9, Line 27, delete "$QP_n$" and insert -- $QP_n$, --, therefor.

In the Claims

In Column 12, Line 64, in Claim 5, delete "lama" and insert -- luma --, therefor.

In Column 13, Line 1, in Claim 5, delete "$Y_{x,y+i}$" and insert -- $Y_{x,y+1}$ --, therefor.

Signed and Sealed this
Eighth Day of July, 2014

Michelle K. Lee
*Deputy Director of the United States Patent and Trademark Office*

CERTIFICATE OF CORRECTION (continued)
U.S. Pat. No. 8,634,436 B2

In Column 13, Line 32, in Claim 9, delete "If $PSNR_{measured}$ 4 0dB;" and insert -- If $PSNR_{measured} \leq 40$ dB; --, therefor.

In Column 13, Line 34, in Claim 9, delete "If $PSNR_{measured} > 5$ 0dB;" and insert -- If $PSNR_{measured} > 50$ dB; --, therefor.

In Column 14, Lines 27-28, in Claim 14, delete "comprising;" and insert -- comprising: --, therefor.

In Column 14, Lines 39-40, in Claim 15, delete "comprising;" and insert -- comprising: --, therefor.